(12) United States Patent
Tong et al.

(10) Patent No.: US 10,178,091 B2
(45) Date of Patent: Jan. 8, 2019

(54) METHOD AND ROUTER FOR ACCESSING NETWORK

(71) Applicant: Huawei Device (Shenzhen) Co., Ltd., Shenzhen (CN)

(72) Inventors: Shuang Tong, Shenzhen (CN); Chaoqun Yao, Shenzhen (CN); Yonghong Zhu, Shenzhen (CN)

(73) Assignee: Huawei Device (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 15/301,292

(22) PCT Filed: Apr. 2, 2014

(86) PCT No.: PCT/CN2014/074638
§ 371 (c)(1),
(2) Date: Sep. 30, 2016

(87) PCT Pub. No.: WO2015/149303
PCT Pub. Date: Oct. 8, 2015

(65) Prior Publication Data
US 2017/0026364 A1 Jan. 26, 2017

(51) Int. Cl.
*H04L 29/06* (2006.01)
*H04L 12/64* (2006.01)

(52) U.S. Cl.
CPC ...... *H04L 63/0846* (2013.01); *H04L 12/6418* (2013.01); *H04L 63/08* (2013.01);
(Continued)

(58) Field of Classification Search
CPC ..... H04L 63/08–63/10; H04L 63/101–63/102; H04L 12/6418; G06F 21/31
See application file for complete search history.

(56) References Cited

U.S. PATENT DOCUMENTS 7,979,912 B1    7/2011  Roka
8,266,266 B2 *  9/2012  Short ..................... H04L 63/08
                                                        709/203
(Continued)

FOREIGN PATENT DOCUMENTS

CN     1881228 A    12/2006
CN   101237325 A     8/2008
(Continued)

*Primary Examiner* — Meng Li
*Assistant Examiner* — Shaqueal D Wade
(74) *Attorney, Agent, or Firm* — Leydig, Voit & Mayer, Ltd.

(57) ABSTRACT

Embodiments of the present invention provide a method implemented on a router for accessing a network, where the method comprises: obtaining an access password sent by a terminal device; performing matching between the access password and each preset access password in an access password list in which at least two preset access passwords are stored; when the access password matches a preset access password in the access password list, determining whether the preset access password is bound to a device identifier list, and when the preset access password is bound to the device identifier list, determining whether a device identifier of the terminal device exists in the bound device identifier list; and when it is determined that the device identifier exists in the device identifier list, allowing the terminal device to access the network.

7 Claims, 2 Drawing Sheets

(52) U.S. Cl.
CPC ........ *H04L 63/0876* (2013.01); *H04L 63/101* (2013.01); *H04L 63/102* (2013.01)

(56) References Cited

U.S. PATENT DOCUMENTS

| | | | |
|---|---|---|---|
| 9,763,094 B2 * | 9/2017 | Thelen | .................. H04W 12/08 |
| 2008/0051061 A1 | 2/2008 | Takahashi | |
| 2014/0366114 A1 | 12/2014 | Wang et al. | |

FOREIGN PATENT DOCUMENTS

| | | |
|---|---|---|
| CN | 101668325 A | 3/2010 |
| CN | 102624913 A | 8/2012 |
| CN | 103415016 A | 11/2013 |
| JP | 2000099464 A | 4/2000 |
| JP | 2007208759 A | 8/2007 |
| JP | 2015509632 A | 3/2015 |
| WO | 2013127292 A1 | 9/2013 |

* cited by examiner

METHOD AND ROUTER FOR ACCESSING NETWORK

CROSS-REFERENCE TO RELATED APPLICATIONS

This application is a national stage of International Application No. PCT/CN2014/074638, filed on Apr. 2, 2014, which is hereby incorporated by reference in its entirety.

TECHNICAL FIELD

Embodiments of the present invention relate to the field of communications technologies, and in particular, to a method and router for accessing a network.

BACKGROUND

With continuous development and progress of technologies, intelligent terminals such as a mobile phone and a tablet computer are increasingly popular, and requirements imposed by people on a wireless network are increasingly urgent. As a necessary device for accessing a network, a router also gradually steps into the lives of people.

Most routers generally protect network security in an "encryption" manner. That is, all terminal devices need to enter an access password when accessing a network by using a router, and only when an access password entered by a user matches a preset preset access password, a terminal device can be allowed to access a network. However, currently, for a router, a single preset access password is set to protect a network, which causes relatively low router security.

SUMMARY

Embodiments of the present invention provide a method and router for accessing a network, so as to improve router security.

Specific technical solutions are as follows:

A first aspect of the embodiments of the present invention provides an apparatus for accessing a network, including:

an obtaining module, configured to obtain an access request message sent by a terminal device, wherein the access request message includes an access password, and a device identifier of the terminal device;

a matching module, configured to perform matching between the access password obtained by the obtaining module and each preset access password in an access password list in which at least two preset access passwords are stored;

a determining module, configured to: when the matching module determines by means of matching that the access password matches a preset access password in the access password list, determine whether the preset access password is bound to a device identifier list, where at least one device identifier is stored in the device identifier list; and when determining that the preset access password is bound to the device identifier list, determine whether the device identifier of the terminal device exists in the device identifier list; and a processing module, configured to: when the determining module determines that the device identifier exists in the device identifier list, allow the terminal device to access the network.

With reference to the first aspect, in a first possible implementation manner, the processing module is specifically configured to: when the determining module determines that the preset access password is not bound to the device identifier list, allow the terminal device to access the network.

With reference to the first aspect, in a second possible implementation manner, the obtaining module is further configured to: when the terminal device accesses the network by using a preset access password not bound to the device identifier list, obtain the device identifier of the terminal device, and store the obtained device identifier in a temporary device identifier list, where the temporary device identifier list is used to temporarily store a device identifier;

the determining module is further configured to determine whether a total quantity of device identifiers in the temporary device identifier list reaches a preset threshold; and the processing module is further configured to: when the determining module determines that the total quantity of the device identifiers in the temporary device identifier list reaches the preset threshold, add some or all device identifiers in the temporary device identifier list to the bound device identifier list, or to an access limited list, where a terminal device corresponding to a device identifier in the access limited list is rejected access to the network.

With reference to the first aspect, in a third possible implementation manner, the processing module is further configured to: when the device identifier does not exist in the device identifier list, reject the terminal device access to the network.

With reference to the first aspect, in a fourth possible implementation manner, the processing module is further configured to periodically modify a preset access password not bound to the device identifier list.

A second aspect of the embodiments of the present invention provides a router, including:

one or more processors; and a memory, and one or more programs, where the one or more programs are stored in the memory, and the one or more processors execute the one or more programs; and the one or more programs are configured to perform the following steps:

obtaining an access request message sent by a terminal device, where the access request message includes an access password, and a device identifier of the terminal device;

performing matching between the access password and each preset access password in an access password list, where at least two preset access passwords are stored in the access password list;

when the access password matches a preset access password in the access password list, determining whether the preset access password is bound to a device identifier list, where at least one device identifier is stored in the device identifier list; and when the preset access password is bound to the device identifier list, determining whether the device identifier of the terminal device exists in the device identifier list; and when it is determined that the device identifier exists in the device identifier list, allowing the terminal device to access a network.

With reference to the second aspect, in a first possible implementation manner, the one or more programs further perform:

when the preset access password is not bound to the device identifier list, allowing the terminal device to access a network.

With reference to the second aspect, in a second possible implementation manner, the one or more programs are further configured to perform a step:

when the terminal device accesses the network by using the preset access password not bound to the device identifier list, obtaining the device identifier of the terminal device, and storing the obtained device identifier in a temporary device identifier list; determining whether a total quantity of device identifiers in the temporary device identifier list reaches a preset threshold; and when the total quantity of the device identifiers reaches the preset threshold, adding some or all device identifiers in the temporary device identifier list to the bound device identifier list, or to an access limited list, where a terminal device corresponding to a device identifier in the access limited list is rejected access to the network, and the temporary device identifier list is used to temporarily store a device identifier.

With reference to the second aspect, in a third possible implementation manner, the one or more programs are further configured to perform a step:

when the device identifier does not exist in the device identifier list, rejecting the terminal device access to the network.

With reference to the second aspect, in a fourth possible implementation manner, the one or more programs are further configured to perform a step:

periodically modifying a preset access password not bound to the device identifier list.

A third aspect of the embodiments of the present invention provides a method for accessing a network, including:

obtaining an access request message sent by a terminal device, where the access request message includes an access password, and a device identifier of the terminal device;

performing matching between the access password and each preset access password in an access password list in which at least two preset access passwords are stored;

when the access password matches a preset access password in the access password list, determining whether the preset access password is bound to a device identifier list, where at least one device identifier is stored in the device identifier list;

when the preset access password is bound to the device identifier list, determining whether the device identifier of the terminal device exists in the device identifier list; and when it is determined that the device identifier exists in the device identifier list, allowing the terminal device to access a network.

With reference to the third aspect, in a first possible implementation manner, the method further includes:

when the preset access password is not bound to the device identifier list, allowing the terminal device to access a network.

With reference to the first possible implementation manner of the third aspect, in a second possible implementation manner, after the when the preset access password is not bound to the device identifier list, allowing the terminal device to access a network, the method further includes:

obtaining the device identifier of the terminal device, and storing the obtained device identifier in a temporary device identifier list, where the temporary device identifier list is used to temporarily store a device identifier;

determining whether a total quantity of device identifiers in the temporary device identifier list reaches a preset threshold; and if the total quantity of the device identifiers reaches the preset threshold, adding some or all device identifiers in the temporary device identifier list to the bound device identifier list, or to an access limited list, where a terminal device corresponding to a device identifier in the access limited list is rejected access to the network.

With reference to the third aspect, in a third possible implementation manner, the method further includes:

when the device identifier does not exist in the device identifier list, rejecting the terminal device access to the network.

With reference to the third aspect, in a fourth possible implementation manner, the method further includes:

periodically modifying a preset access password not bound to the device identifier list.

The embodiments of the present invention provide an apparatus for accessing a network, where the apparatus includes: an obtaining module, configured to obtain an access request message sent by a terminal device; a matching module, configured to perform matching between an access password and each preset access password in an access password list in which at least two preset access passwords are stored; a determining module, configured to: when the matching module determines by means of matching that the access password matches a preset access password in the access password list, determine whether the preset access password is bound to a device identifier list of a device identifier; and when determining that the preset access password is bound to the device identifier list, determine whether a device identifier of the terminal device exists in the device identifier list; and a processing module, configured to: when the determining module determines that the device identifier exists in the device identifier list, allow the terminal device to access the network. That is, in an access control apparatus provided in the embodiments of the present invention, by setting an access password list, the apparatus may bind a relatively simple preset access password in access passwords to a device identifier of a terminal device frequently used by a user. In this way, the terminal device frequently used by the user can simply and conveniently access a network; and a relatively complex preset access password in the access password list is used to limit network access of a terminal device not frequently used by the user, thereby improving router security performance.

The embodiments of the present invention provide a method for accessing a network, where the method includes: obtaining an access request message sent by a terminal device; performing matching between an access password and each preset access password in an access password list in which at least two preset access passwords are stored; if the access password matches a preset access password in the access password list, determining whether the preset access password is bound to a device identifier list; and when the preset access password is bound to the device identifier list, determining whether a device identifier of the terminal device exists in the bound device identifier list; and when it is determined that the device identifier exists in the device identifier list, allowing the terminal device to access a network. In this way, a router may control access of different terminal devices by using multiple preset access passwords, that is, a terminal device frequently used by a user may perform access by using a relatively simple preset access password, while a terminal device not frequently used by the user performs access by using a relatively complex preset access password. In this way, not only router security is improved, but also the terminal device frequently used by the user can simply and conveniently access a network, thereby improving user experience.

DESCRIPTION OF EMBODIMENTS

The terms used in the embodiments of the present invention are merely for the purpose of illustrating specific embodiments, and are not intended to limit the present invention. The terms "a", "said" and "the" of singular forms used in the embodiments and the appended claims of the present application are also intended to include plural forms, unless otherwise specified in the context clearly. It should also be understood that, the term "and/or" used herein indicates and includes any or all possible combinations of one or more associated listed items.

It should be understood that, although terms: first preset access password and second preset access password may be used in the embodiments of the present invention to describe a preset access password set in a router, the preset access password should not be limited to these terms. These terms are used to only distinguish between multiple preset access passwords. For example, in a case of not departing from the scope of the embodiments of the present invention, a first preset access password may also be referred to as a second preset access password, and similarly, a second preset access password may also be referred to a first preset access password. Certainly, terminal devices in the embodiments of the present invention may be, but is not be limited to, terminal devices such as a mobile phone and a computer.

Depending on a context, the word "if" used herein may be explained as "while" or "when", or "in response to determining of" or "in response to detecting of". Similarly, depending on a context, the phrase "if it is determined that" or "if it is detected that (stated condition or event)" may be explained as "when it is determined that" or "in response to determining of" or "when it is detected that (stated condition or event)" or "in response to detecting of (stated condition or event)".

One Embodiment

Figure 1:
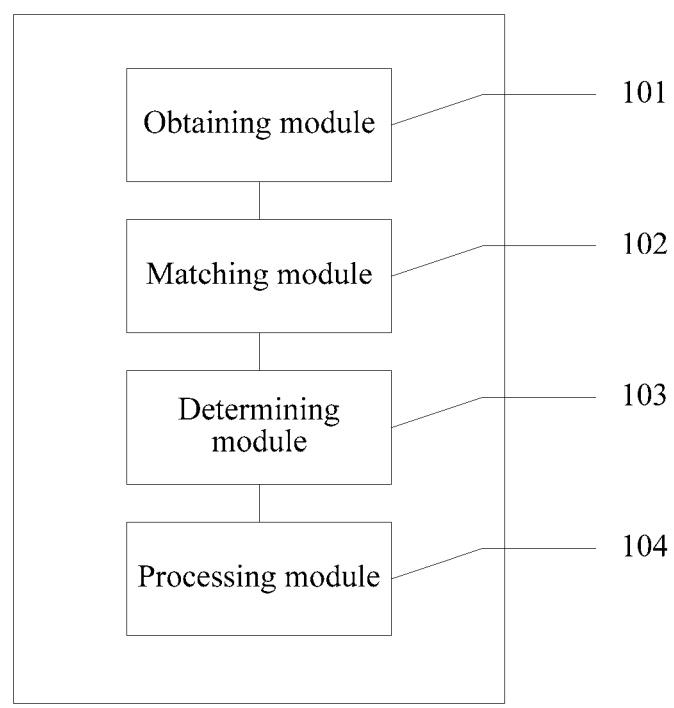
FIG. 1 is a schematic structural diagram of an apparatus for accessing a network according to an embodiment of the present invention.

To resolve a problem of relatively low router security, this embodiment of the present invention provides an apparatus for accessing a network. As shown in FIG. 1, which is a schematic structural diagram of an apparatus for accessing a network according to an embodiment of the present invention, the apparatus includes:

an obtaining module 101, configured to obtain an access request message sent by a terminal device, where the access request message includes an access password, and a device identifier of the terminal device;

a matching module 102, configured to perform matching between the access password obtained by the obtaining module 101 and each preset access password in an access password list, where at least two preset access passwords are stored in the access password list;

a determining module 103, configured to: when the matching module 102 determines by means of matching that the access password matches a preset access password in the access password list, determine whether the preset access password is bound to a device identifier list, where at least one device identifier is stored in the device identifier list, where the determining module 103 is further configured to: when determining that the preset access password is bound to the device identifier list, determine whether the device identifier of the terminal device exists in the device identifier list; and a processing module 104, configured to: when the determining module 103 determines that the device identifier exists in the device identifier list, allow the terminal device to access the network.

Before a router is used, to ensure network security, an access password is always set in the router. In this embodiment of the present invention, a first preset access password and a second preset access password may be set in a setting interface of a router, where after the first preset access password is set, a first preset password may be bound to a device identifier list in the setting interface of the router. A device identifier of a terminal device frequently used by a user may be stored in the device identifier list, and the device identifier herein may be a hardware address (Media Access Control, MAC for short) of the terminal device or identifiers such as a name and a model number of the terminal device. In this embodiment of the present invention, a device identifier that identifies a terminal device is not specifically limited, and any device identifier that can uniquely identify a terminal device may be stored in the device identifier list. Table 1 shows that a preset access password is bound to a MAC address of a terminal device:

TABLE 1

| Preset access password | Device identifier list |
|---|---|
| 123 | MAC1 |
|  | MAC2 |
|  | MAC3 |
| 1a2b3c4d5e |  |

Generally, a preset access password bound to a device identifier list is set to a relatively simple password. For example, the first preset access password is "123" in Table 1, which can help a user memorize and input the password. Obviously, directly using the first preset access password causes relatively low router security; therefore, in this embodiment of the present invention, the first preset access password is bound to a device identifier list, and when a router receives an access password that matches the first preset access password and that is sent by a terminal device, the router determines whether a device identifier of the terminal device exists in the device identifier list to which the first preset access password is bound, and if the device identifier is not in the device identifier list to which the first preset access password is bound, the router rejects access by the terminal device; when the device identifier is in the device identifier list to which the first preset access password is bound, the router allows the terminal device to access the router.

The second preset access password is used to manage a terminal device not frequently used by the user, and the second preset access password is set to enable the terminal device not frequently used by the user to also access a network; therefore, the second preset access password is set to a relatively complex password, for example, "1a2b3c4d5e" set in Table 1 is the second preset access password. Because the second preset access password is a password that enables the terminal device not frequently used by the user to access a network, the second preset access password does not need to be bound to the device identifier list (as shown in Table 1). As long as the access request message sent by the terminal device and received by the router includes the second preset access password, the router allows access of the terminal device.

Further, to ensure network security, the processing module 104 in the router may adjust the second preset access password in Table 1 as follows:

First: the processing module 104 in the router stores in real time the second preset access password modified by the user, for example, modifying the second preset access password in Table 1 from "1a2b3c4d5e" to "abcdefgh".

Second: the processing module 104 in the router periodically modifies the second preset access password, that is, as long as specified time is up, the processing module 104 in the router randomly generates a relatively complex access password, and then replaces the original second preset access password with the randomly generated access password. Certainly, after the second preset access password is modified, the newly set preset access password may be viewed at any time in the setting interface of the router.

Third: if a standby preset access password is set in the processing module 104 in the router, the processing module 104 may further replace the original second preset access password with the standby preset access password, for example, replacing "1a2b3c4d5e" in Table 1 with a standby preset access password "m1m2m3m4m5m6" or "o0o0o0o0o" set in the router. Certainly, these standby preset access passwords may also periodically replace the second preset access password.

Herein, it should be noted that, even if the second preset access password is replaced at any time, the replacement of the second preset access password does not change the first preset access password. In this way, not only security of the second preset access password is ensured, but also the terminal device frequently used by the user is enabled to access a network by using the relatively simple first preset access password.

After a preset access password and a device identifier list to which the preset access password is bound are set and stored in the router, if the terminal device sends an access request message to the router, the obtaining module 101 in the router first obtains the access request message sent by the terminal, where the access password, and the device identifier of the terminal device are stored in the access request message.

The matching module 102 in the router invokes the access password list, and performs matching between the access password in the access request message and each preset access password in the access password list, and if a matching result of the matching module 102 is that the access password sent by the terminal device does not match any preset access password in the access password list, the router rejects access by the terminal device.

If a matching result of the matching module 102 is that the access password sent by the terminal device matches a preset access password in the access password list, the determining module 103 determines whether the preset access password that matches the access password is bound to the device identifier list. If the preset access password is not bound to the device identifier list, the processing module 103 allows the terminal device to access a network, for example, if the access request message sent by the terminal device includes the second preset access password "1a2b3c4d5e" in Table 1, the router allows the terminal device to access a network.

If the preset access password that matches the access password is bound to the device identifier list, the router obtains, by using the obtaining module 101, from the access request message sent by the terminal device, the device identifier of the terminal device, that is, a MAC address of the terminal device, then the determining module 103 in the router determines whether the device identifier of the terminal device exists in the device identifier list, and if the device identifier of the terminal device does not exist in the device identifier list, the processing module 104 rejects the terminal device access to the network; if the device identifier of the terminal device exists in the device identifier list, the processing module 104 allows the terminal device to access a network.

For example, if the access password sent by the terminal device is the first preset access password "123" in Table 1, the router obtains the MAC address of the terminal device by using the obtaining module 101, and the determining module 103 in the router further invokes a device identifier list to which the first preset access password "123" is bound, and if the determining module 103 determines that the MAC address of the terminal device and a MAC1 address in the device identifier list are a same MAC address, the processing module 104 in the router allows the terminal device to access a network; if the MAC address of the terminal device does not match any MAC address in the device identifier list, the processing module 104 rejects the terminal device access to the network.

In this embodiment of the present invention, an access password list is set in a router, and a relatively simple preset access password is bound to a device identifier of a terminal device frequently used by a user; in this way, the terminal device frequently used by the user can simply and conveniently access a network; and a relatively complex preset access password is used to limit network access of a terminal device not frequently used by the user, thereby effectively ensuring network security, that is, improving router security while ensuring user experience.

In this embodiment of the present invention, a preset access password used to limit network access of a terminal device not frequently used by a user may be replaced periodically, and a preset access password of a terminal device frequently used by a user is not affected; in this way, not only improvement of the router in network security is ensured, but also a complex operation of password input caused to a user due to replacement of an access password in the router is avoided, and use experience of the user is improved.

Further, in this embodiment of the present invention, if the terminal device accesses the network by using the second preset access password, the obtaining module 101 in the router obtains the device identifier of the terminal device, and stores the obtained device identifier in a temporary device identifier list, as shown in Table 2:

TABLE 2

| Preset access password | Device identifier list |
| --- | --- |
| 123 | MAC1 |
|  | MAC2 |
|  | MAC3 |
| 1a2b3c4d5e | MAC4 |
|  | MAC5 |

Specifically, if the terminal device accesses the network by using the second preset access password, it indicates that the terminal device is a terminal device not frequently used by the user; in this case, the obtaining module 101 in the router obtains a device identifier of the terminal device that accesses a network by using the second preset access password, and stores the device identifier obtained by the terminal device in the temporary device identifier list, for example, MAC4 and MAC5 in Table 2.

In a working process of the router, the determining module 103 in the router periodically determines whether a total quantity of device identifiers stored in a temporary identifier list reaches a preset threshold, and the preset threshold herein may be set to positive integers such as 1, 2, and 3. When the total quantity of the device identifiers in the temporary device identifier list reaches the preset threshold, the processing module 104 in the router processes the temporary device identifier list. There may be three processing manners herein:

First manner: the processing module 104 in the router directly deletes some or all device identifiers in the temporary device identifier list.

Second manner: the processing module 104 in the router transfers some or all device identifiers in the temporary device identifier list to a device identifier list to which the first preset access password is bound. Certainly, a terminal device corresponding to a device identifier transferred from the temporary device identifier list to the device identifier list may access the router by using the first preset access password.

Third manner: the processing module 104 in the router recreates a device identifier list, binds a newly set preset access password to the newly created device identifier list, and then transfers some or all device identifier in the temporary device identifier list to the newly created device identifier list; in this case, a terminal device corresponding to a device identifier in the newly created device identifier list may access a network by using the bound preset access password, which can help a user effectively manage, by using the preset access password, network access of a terminal device frequently used by a user and a terminal device not frequently used by the user.

Fourth manner: the processing module 104 in the router sets an access limited list, adds some or all device identifiers in the temporary device identifier list to the access limited list, and when a terminal device corresponding to a device identifier in the access limited list sends an access request message that includes a preset access password, and when the processing module 104 in the router determines that the device identifier of the terminal device exists in the access limited list, the router rejects the terminal device access to the network, which can further improve protection of the router over network security.

By means of the foregoing four manners for processing a device identifier in a temporary device identifier list, a device identifier may be added to or deleted from the device identifier list of the router, so that these terminal devices may access a network by using a relatively simple first preset access password. Certainly, some terminal devices in which the user suspects that a security loophole exists may be added to the access limited list; therefore, other dangerous terminal devices can be effectively prevented from accessing the router, which further improves protection of the router over network security.

Certainly, in this embodiment of the present invention, multiple preset access passwords may be set in an access password list, each preset access password may be bound to a device identifier list, and a device identifier of a same terminal device may exist in different device identifier lists, as shown in Table 3:

TABLE 3

| Preset access password | Device identifier list |
|---|---|
| 123 | MAC1 |
|  | MAC2 |
|  | MAC3 |
| 1a2b3c4d5e |  |
| 012345 | MAC1 |
|  | MAC3 |
|  | MAC7 |

Certainly, a preset access password not bound to the device identifier list may correspond to a temporary device identifier list, where a function of the temporary device identifier list is completely the same as that of the temporary device identifier list shown in Table 2.

In addition, in this embodiment of the present invention, a preset access password bound to the device identifier list may be set to null, that is, as long as the device identifier list exists in the router, and a device identifier of a terminal device that requests to access a network exists in the device identifier list, in a case in which the terminal device does not send any access password, the router still allows access of the terminal device.

Another Embodiment

To resolve current convenience and security problems of an access password of a router, this embodiment of the present invention provides a method for accessing a network. The method includes: obtaining an access request message sent by a terminal device, where the access request message includes an access password, and a device identifier of the terminal device; performing matching between the access password and each preset access password in an access password list, where at least two preset access passwords are stored in the access password list; if the access password matches a preset access password in the access password list, determining whether the preset access password is bound to a device identifier list; and when the preset access password is bound to the device identifier list, determining whether the device identifier of the terminal device exists in the device identifier list; and when the device identifier exists in the device identifier list, allowing the terminal device to access a network.

According to the method in this embodiment of the present invention, an access password list including at least two preset access passwords may be set in the router, and a relatively simple preset access password is bound to a device identifier of a terminal device frequently used by a user, so that the terminal device frequently used by the user can simply and conveniently access a network; and a relatively complex preset access password is used to limit network access of a terminal device not frequently used by the user, thereby effectively ensuring network security.

The following describes the method by using specific embodiments.

Before a router is used, to ensure network security, an access password is always set in the router. In this embodiment of the present invention, a first preset access password and a second preset access password may be set in a setting interface of a router, where after the first preset access password is set, a first preset password may be bound to a device identifier list in the setting interface of the router. A device identifier of a terminal device frequently used by a user may be stored in the device identifier list, and the device identifier herein may be a hardware address (Media Access Control, MAC for short) of the terminal device or identifiers such as a name and a model number of the terminal device. In this embodiment of the present invention, a device identifier that identifies a terminal device is not specifically limited, and any device identifier that can uniquely identify a terminal device may be stored in the device identifier list. Table 4 shows that a preset access password is bound to a MAC address of a terminal device:

TABLE 4

| Preset access password | Device identifier list |
| --- | --- |
| 123 | MAC1 |
|  | MAC2 |
|  | MAC3 |
| 1a2b3c4d5e |  |

Generally, a preset access password bound to a device identifier list is set to a relatively simple password. The first preset access password is "123" in Table 4, which can help a user memorize and input the password. Obviously, setting only the first preset access password causes relatively low router security; therefore, in this embodiment of the present invention, the first preset access password is bound to a device identifier list, and when a router receives an access password that matches the first preset access password and that is sent by a terminal device, the router determines whether a device identifier of the terminal device exists in the device identifier list to which the first preset access password is bound, and if the device identifier is not in the device identifier list to which the first preset access password is bound, the router rejects access by the terminal device; if the device identifier is in the device identifier list to which the first preset access password is bound, the router allows the terminal device to access the router.

The second preset access password is used to manage a terminal device not frequently used by the user; in this case, the second preset access password is set to enable the terminal device not frequently used by the user to also access a network; therefore, the second preset access password is set to a relatively complex password, for example, "1a2b3c4d5e" set in Table 4 is the second preset access password. Because the second preset access password is a password that enables the terminal device not frequently used by the user to access a network, the second preset access password does not need to be bound to the device identifier list (as shown in Table 4). As long as the access request message sent by the terminal device and received by the router includes the second preset access password, the router allows access of the terminal device.

Further, to ensure network security, the router may adjust the second preset access password in Table 4 as follows:

First, the router stores in real time the second preset access password modified by the user, for example, replacing the second preset access password in Table 4: "1a2b3c4d5e" with "abcdefgh" or modifying the second preset access password in Table 4 from "1a2b3c4d5e" to "abcdefgh".

Second: the router periodically modifies the second preset access password, that is, as long as specified time is up, the router randomly generates a relatively complex access password, and then replaces the original second preset access password with the randomly generated access password. Certainly, after the second preset access password is modified, a preset access password that replaces the second preset access password can be viewed at any time in the setting interface of the router.

Third: if a standby preset access password is set in the router, the processing module 104 may further replace the original second preset access password with the standby preset access password, for example, replacing "1a2b3c4d5e" in Table 1 with a standby preset access password "m1m2m3m4m5m6" or "o0o0o0o0o0" set in the router. Certainly, these standby preset access passwords may also periodically replace the second preset access password.

Herein, it should be noted that, even if the second preset access password is replaced at any time, the replacement of the second preset access password does not change a first access password. In this way, not only security of the second preset access password is ensured, but also the terminal device frequently used by the user is enabled to access a network by using the relatively simple first preset access password.

Figure 2:
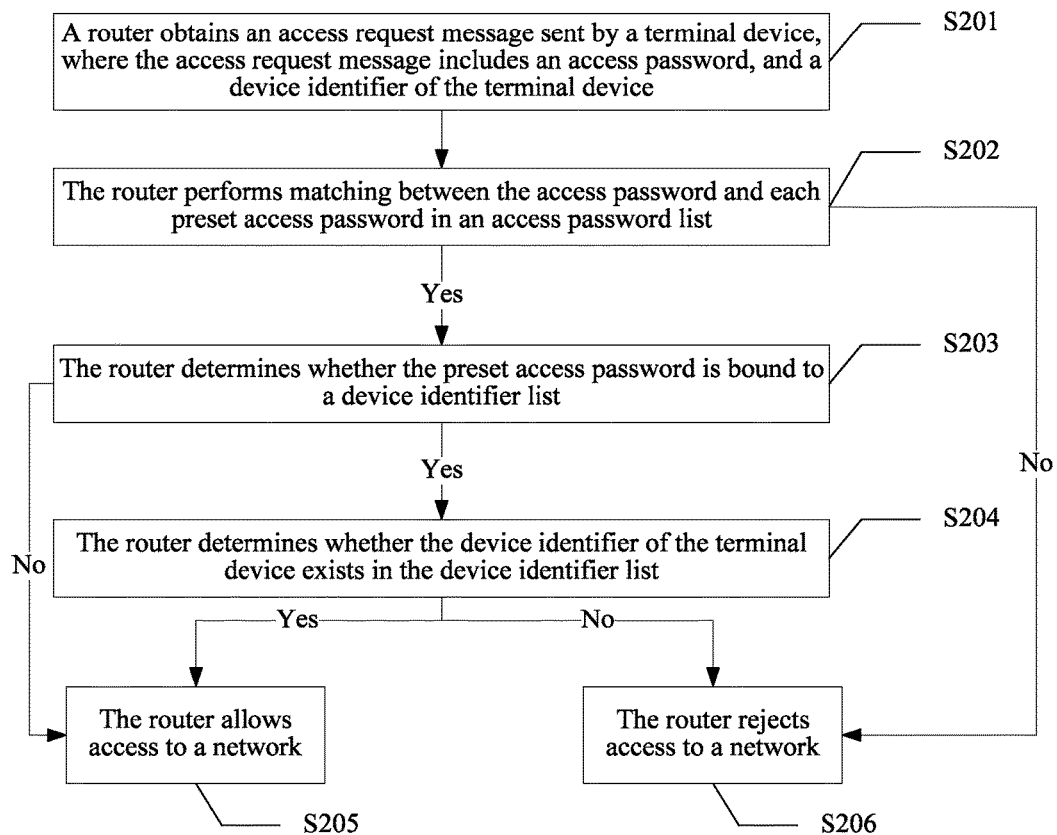
FIG. 2 is a flowchart of a method for accessing a network according to an embodiment of the present invention.

After the user sets and stores, in the router, a preset access password and a device identifier list to which the preset access password is bound, if the router receives an access request message sent by the terminal device, the router performs execution according to the process shown in FIG. 2. FIG. 2 shows a flowchart of an access management method of a router according to an embodiment of the present invention, and the method includes:

S201: A router obtains an access request message sent by a terminal device, where the access request message includes an access password, and a device identifier of the terminal device.

S202: The router performs matching between the access password and each preset access password in an access password list, where at least two preset access passwords are stored in the access password list, and if the access password matches a preset access password, proceed to S203; or if the access password does not match any preset access password, proceed to S206.

S203: The router determines whether the preset access password is bound to a device identifier list, and if the preset access password is bound to the device identifier list, proceed to S204; or if the preset access password is not bound to the device identifier list, proceed to S205.

S204: The router determines whether the device identifier of the terminal device exists in the device identifier list, and if the device identifier of the terminal device exists in the device identifier list, proceed to S205; or if the device identifier of the terminal device does not exist in the device identifier list, proceed to S206.

S205: The router allows the terminal device to access a network.

S206: The router rejects the terminal device to access the network.

Specifically, after receiving an access request message sent by the terminal device, the router invokes an access password list, and performs matching between an access password in the access request message sent by the terminal device and each preset access password in the access password list, and if the access password in the access request message sent by the terminal device matches no preset access password in the access password list, the router rejects the terminal device access to the network.

If the access password in the access request message sent by the terminal device matches a preset access password in the access password list, the router determines whether the preset access password that is in the access password list and that matches the access password is bound to the device identifier list. If the preset access password is not bound to the device identifier list, the terminal device is allowed to access a network, for example, if the access request message sent by the terminal device includes the second preset access password "1a2b3c4d5e" in Table 4, the router allows access of the terminal device.

If the preset access password that matches the access password is bound to the device identifier list, the router further obtains a device identifier in the access request message, where the device identifier may be a MAC address of the terminal device, and the router determines whether the device identifier of the terminal device exists in the bound device identifier list, and if the device identifier of the terminal device does not exist in the bound device identifier list, rejects the terminal device access to the network, if the device identifier of the terminal device exists in the bound device identifier list, allows the terminal device to access a network. For example, if the access password in the access request message sent by the terminal device is the first preset access password "123" in Table 4, the router obtains a MAC address of the terminal device, and the router further invokes a device identifier list to which the first preset access password "123" is bound, and if it is determined that the MAC address of the terminal device is the same as a MAC1 address in the device identifier list, the router allows access of the terminal device; or if the MAC address of the terminal device matches no MAC address in the device identifier list, the router rejects access by the terminal device.

In this embodiment of the present invention, an access password list is set in a router, and a relatively simple preset access password is bound to a device identifier of a terminal device frequently used by a user; in this way, the terminal device frequently used by the user can simply and conveniently access a network; and a relatively complex preset access password is used to limit network access of a terminal device not frequently used by the user, thereby greatly improving router security performance while ensuring user experience.

In this embodiment of the present invention, a password used to limit network access of a terminal device not frequently used by a user may be replaced periodically, and an access password of a terminal device frequently used by the user is not affected; in this way, not only improvement of the router in network security is ensured, but also a complex operation of password input caused to the terminal device frequently used by the user due to replacement of an access password in the router is reduced, and use experience of the user is improved.

In addition, in this embodiment of the present invention, if the terminal device accesses the network by using the second preset access password, the router obtains the device identifier of the terminal device, and stores the obtained device identifier in the temporary device identifier list, as shown in Table 5:

TABLE 5

| Preset access password | Device identifier list |
|---|---|
| 123 | MAC1 |
| | MAC2 |
| | MAC3 |
| 1a2b3c4d5e | MAC4 |
| | MAC5 |

Specifically, if the terminal device accesses the network by using the second preset access password, the router obtains a device identifier of the terminal device that accesses a network by using the second preset access password, and stores the obtained device identifier in a temporary access password list, for example, MAC4 and MAC5 in Table 5.

In a working process of the router, the router periodically determines whether a total quantity of device identifiers stored in a temporary identifier list corresponding to a second access password reaches a preset threshold, and the preset threshold herein may be set to positive integers such as 1, 2, and 3. When the total quantity of the device identifiers in the temporary device identifier list corresponding to the second preset access password reaches the preset threshold, the router processes the temporary device identifier list. There may be three processing manners herein:

First manner: the router directly deletes some or all device identifiers in the temporary device identifier list.

Second manner: the router transfers some or all device identifiers in the temporary device identifier list to a device identifier list to which the first preset access password is bound. Certainly, a terminal device corresponding to a device identifier transferred from the temporary device identifier list to the device identifier list may access the router by using the first preset access password.

Third manner: the router recreates a device identifier list, binds a newly set preset access password to the newly created device identifier list, and then transfers some or all device identifier in the temporary device identifier list to the newly created device identifier list; in this case, a terminal device corresponding to a device identifier in the newly created device identifier list may access a network by using the newly set preset access password, which can help a user effectively manage, by using the preset access password, access of a terminal device frequently used by a user and a terminal device not frequently used by the user.

Fourth manner: the router sets an access limited list, adds some or all device identifiers in the temporary device identifier list to the access limited list, and when a terminal device corresponding to a device identifier in the access limited list sends an access request message that includes a preset access password, and when the router determines that the device identifier of the terminal device exists in the access limited list, the router rejects the terminal device access to the network, which can further improve protection of the router over network security.

By means of the foregoing four manners for processing a device identifier in a temporary device identifier list, a device identifier may be added to or deleted from the device identifier list of the router, so that these terminal devices may access a network by using a relatively simple first preset access password. Certainly, some terminal devices in which the user suspects that a security loophole exists may be added to the access limited list; therefore, other dangerous terminal devices can be effectively prevented from accessing the router, which further improves protection of the router over network security.

Certainly, in this embodiment of the present invention, multiple preset access passwords may be set in an access password list, each preset access password may be bound to a device identifier list, and a device identifier of a same terminal device may exist in different device identifier lists, as shown in Table 6:

TABLE 6

| Preset access password | Device identifier list |
|---|---|
| 123 | MAC1 |
| | MAC2 |
| | MAC3 |
| 1a2b3c4d5e012345 | |
| | MAC1 |
| | MAC3 |
| | MAC7 |

Certainly, a preset access password not bound to the device identifier list may correspond to a temporary device identifier list, where a function of the temporary device identifier list is completely the same as that of the temporary device identifier list shown in Table 5.

In addition, in this embodiment of the present invention, a preset access password bound to the device identifier list may be set to null, that is, as long as the device identifier list exists in the router, and a device identifier of a terminal device that requests to access a network exists in the device identifier list, in a case in which the terminal device does not send any access password, the router still allows the terminal device to access a network.

Still Another Embodiment

Figure 3:
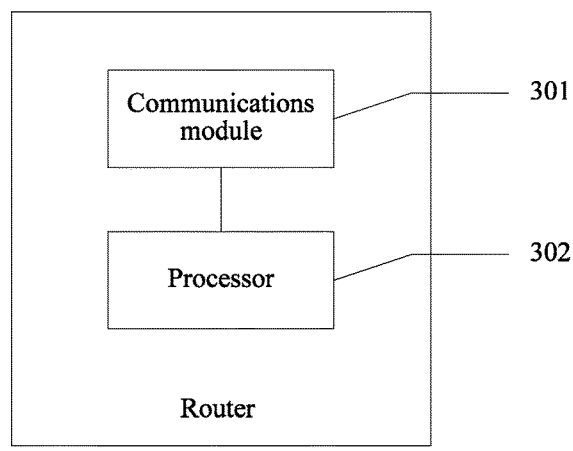
FIG. 3 is a schematic structural diagram of a router according to an embodiment of the present invention.

To resolve current convenience and security problems of an access password of a router, this embodiment of the present invention provides a router. As shown in FIG. 3, which is a schematic structural diagram of a router in this embodiment, the router includes:
one or more processors; and
a memory, and one or more programs, where the one or more programs are stored in the memory, and the one or more processors execute the one or more programs; and the one or more programs are configured to perform the following steps:
obtaining an access request message sent by a terminal device, where the access request message includes an access password, and a device identifier of the terminal device; performing matching between the access password and each preset access password in an access password list, where at least two preset access passwords are stored in the access password list; when the access password matches a preset access password in the access password list, determining whether the preset access password is bound to a device identifier list, where at least one device identifier is stored in the device identifier list; and when the preset access password is bound to the device identifier list, determining whether the device identifier of the terminal device exists in the device identifier list; and when it is determined that the device identifier exists in the device identifier list, allowing the terminal device to access a network.

Further, the one or more programs are further configured to perform a step:
when the preset access password is not bound to the device identifier list, allowing the terminal device to access a network.

Further, the one or more programs are further configured to perform a step:
obtaining the device identifier of the terminal device, and storing the obtained device identifier in a temporary device identifier list, where the temporary device identifier list is used to temporarily store a device identifier; determining whether a total quantity of device identifiers in the temporary device identifier list reaches a preset threshold; and if the total quantity of the device identifiers reaches the preset threshold, adding some or all device identifiers in the temporary device identifier list to the bound device identifier list, or to an access limited list, where a terminal device corresponding to a device identifier in the access limited list is rejected access to the network.

Further, the one or more programs are further configured to perform a step:
when the device identifier does not exist in the device identifier list, rejecting the terminal device access to the network.

Further, the one or more programs are further configured to perform a step:
periodically modifying a preset access password not bound to the device identifier list.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the exemplary embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A router for granting access to a network, the router comprising one or more processors; and a non-transitory processor-readable memory, the non-transitory processor-readable memory including one or more programs executed by the one or more processors to perform, on the router, steps comprising:
   obtaining, from a terminal device, an access request message; comprising an access password and a device identifier of the terminal device;
   performing matching between the access password and each preset access password in an access password list storing at least two preset access passwords;
   when the access password matches a preset access password in the access password list, determining whether the preset access password is bound to a device identifier list storing at least one device identifier;
   when the preset access password is bound to the device identifier list, determining whether the device identifier of the terminal device exists in the device identifier list;
   when the device identifier exists in the device identifier list, granting the terminal device access to the network;
   when the preset access password is not bound to the device identifier list, granting the terminal device access to the network;
   when the terminal device accesses the network by using a preset access password not bound to the device identifier list, obtaining the device identifier of the terminal device, and storing the obtained device identifier in a temporary device identifier list used to temporarily store a device identifier;
   determining whether a total quantity of device identifiers in the temporary device identifier list reaches a preset threshold; and
   when the total quantity of the device identifiers reaches the preset threshold, adding some or all device identifiers in the temporary device identifier list to the bound device identifier list, or to an access limited list, wherein a terminal device corresponding to a device identifier in the access limited list is denied access to the network.

2. The router according to claim 1, wherein, after determining whether the preset access password is bound to a device identifier list, the steps further comprise:
   when the preset access password is bound to the device identifier list, allowing the terminal device to access the network.

3. The router according to claim 1, wherein the steps further comprise:
   when the device identifier does not exist in the device identifier list, denying the terminal device access to the network.

4. The router according to claim 1, wherein the steps further comprise:
   periodically modifying a preset access password not bound to the device identifier list.

5. A method for accessing a network, implemented by a router, comprising:
   obtaining an access request message, comprising an access password, and a device identifier of the terminal device, sent by a terminal device;
   performing matching between the access password and each preset access password in an access password list storing at least two preset access passwords;
   when the access password matches a preset access password in the access password list, determining whether the preset access password is bound to a device identifier list storing at least one device identifier;
   when the preset access password is bound to the device identifier list, determining whether the device identifier of the terminal device exists in the device identifier list; and
   when it is determined that the device identifier exists in the device identifier list, allowing the terminal device to access a network
   wherein, after determining whether the preset access password is bound to a device identifier list, the method further comprises:
   when the preset access password is not bound to the device identifier list, allowing the terminal device to access a network;
   wherein after allowing the terminal device to access a network, when the preset access password is not bound to the device identifier list, the method further comprises:
   obtaining the device identifier of the terminal device, and storing the obtained device identifier in a temporary device identifier list used to temporarily store a device identifier;
   determining whether a total quantity of device identifiers in the temporary device identifier list reaches a preset threshold; and
   when the total quantity of the device identifiers reaches the preset threshold, adding some or all device identifiers in the temporary device identifier list to the bound device identifier list, or to an access limited list, wherein a terminal device corresponding to a device identifier in the access limited list is denied access to the network.

6. The method according to claim 5, further comprising:
   when the device identifier does not exist in the device identifier list, denying the terminal device access to the network.

7. The method according to claim 5, further comprising:
   periodically modifying a preset access password not bound to the device identifier list.

* * * * *